United States Patent
Ward

(10) Patent No.: US 11,105,219 B2
(45) Date of Patent: Aug. 31, 2021

(54) VANE ANGLE SYSTEM ACCURACY IMPROVEMENT

(71) Applicant: United Technologies Corporation, Farmington, CT (US)

(72) Inventor: Thomas W. Ward, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 112 days.

(21) Appl. No.: 16/502,681

(22) Filed: Jul. 3, 2019

(65) Prior Publication Data

US 2021/0003029 A1 Jan. 7, 2021

(51) Int. Cl.
*F01D 17/16* (2006.01)
*F01D 9/04* (2006.01)

(52) U.S. Cl.
CPC .......... *F01D 17/16* (2013.01); *F01D 9/041* (2013.01); *F05D 2220/32* (2013.01); *F05D 2240/12* (2013.01); *F05D 2260/201* (2013.01); *F05D 2260/221* (2013.01)

(58) Field of Classification Search
CPC ...... F01D 17/16; F01D 17/162; F01D 17/167; F01D 9/04; F01D 9/041; F02C 9/18; F05D 2260/201
See application file for complete search history.

(56) References Cited

U.S. PATENT DOCUMENTS

| 4,428,713 A | 1/1984 | Coplin et al. |
| 8,814,498 B2 * | 8/2014 | Goodman ............ F01D 17/145 415/28 |
| 2018/0080338 A1 * | 3/2018 | Kennedy ............... F04D 29/563 |
| 2018/0298820 A1 | 10/2018 | Slavens et al. |
| 2018/0355877 A1 * | 12/2018 | Donnelly ............. F01D 17/105 |

FOREIGN PATENT DOCUMENTS

| EP | 1277918 A1 | 1/2003 |
| EP | 2881548 A1 | 6/2015 |

OTHER PUBLICATIONS

Extended European Search Report; EP Application No. 20180935.7-1004, dated Nov. 9, 2020; 7 pages.

\* cited by examiner

*Primary Examiner* — Woody A Lee, Jr.
*Assistant Examiner* — Maxime M Adjagbe
(74) *Attorney, Agent, or Firm* — Cantor Colburn LLP

(57) ABSTRACT

A stator vane angle system includes an engine case, a plurality of stator vanes located at an interior of the engine case. Each stator vane is rotatable about a stator vane axis. A synchronization ring is located at an exterior of the engine case. The synchronization ring is operably connected to each stator vane of the plurality of stator vanes such that movement of the synchronization ring urges rotation of each stator vane of the plurality of stator vanes about their respective stator vane axes. A plurality of impingement openings extend through the engine case from the interior of the engine case to the exterior of the engine case. The plurality of impingement openings are configured to direct flowpath gases from the interior of the engine case to impinge on the synchronization ring, thereby reducing a thermal mismatch between the engine case and the synchronization ring.

20 Claims, 4 Drawing Sheets

VANE ANGLE SYSTEM ACCURACY IMPROVEMENT

BACKGROUND

Exemplary embodiments of the present disclosure pertain to the art of gas turbine engines, and more particularly to variable pitch vane systems of gas turbine engines.

Variable pitch vane systems are used to dynamically vary flow angles within a gas turbine engine throughout the engine cycle. It is imperative to precisely determine vane positional angles at any selected point throughout the cycle.

In typical variable Stator Vane Angle (SVA) systems for, for example, a compressor of a gas turbine engine, the accuracy of the vane angle suffers due to the steady-state and transient thermal mismatch of the compressor case and SVA system synchronization ring, The compressor case temperature is responsive to and controlled by the compressor air flow inside of the case, while the ring temperature is responsive to controlled by the air outside the case. These temperatures are usually very different. In addition, the case typically responds thermally more quickly than the ring. The resulting temperature difference between the case and the ring causes a radial growth difference between the two components. The design of the SVA system must therefore include a radial gap between the two components. This gap allows the vanes to deviate from the intended vane angle.

BRIEF DESCRIPTION

In one embodiment, a stator vane angle system includes an engine case, a plurality of stator vanes located at an interior of the engine case. Each stator vane is rotatable about a stator vane axis. A synchronization ring is located at an exterior of the engine case. The synchronization ring is operably connected to each stator vane of the plurality of stator vanes such that movement of the synchronization ring urges rotation of each stator vane of the plurality of stator vanes about their respective stator vane axes. A plurality of impingement openings extend through the engine case from the interior of the engine case to the exterior of the engine case. The plurality of impingement openings are configured to direct flowpath gases from the interior of the engine case to impinge on the synchronization ring, thereby reducing a thermal mismatch between the engine case and the synchronization ring.

Additionally or alternatively, in this or other embodiments the plurality of impingement openings each have an impingement opening outlet located at a same axial location as the synchronization ring.

Additionally or alternatively, in this or other embodiments the plurality of impingement openings each extend perpendicular to an engine central longitudinal axis.

Additionally or alternatively, in this or other embodiments the plurality of impingement openings each extend non-perpendicular to an engine central longitudinal axis.

Additionally or alternatively, in this or other embodiments the plurality of impingement openings each extend at an opening angle of between 45 degrees and 90 degrees relative to the engine central longitudinal axis.

Additionally or alternatively, in this or other embodiments the plurality of stator vanes are each operably connected to the synchronization ring via a vane arm.

Additionally or alternatively, in this or other embodiments the plurality of impingement openings are equally spaced about a circumference of the engine case.

Additionally or alternatively, in this or other embodiments the engine case is a compressor case or a turbine case of a gas turbine engine.

In another embodiment, a gas turbine engine includes a combustor and a stator vane angle system operably connected to the combustor. The stator vane angle system includes an engine case, and a plurality of stator vanes located at an interior of the engine case. Each stator vane is rotatable about a stator vane axis. A synchronization ring is located at an exterior of the engine case. The synchronization ring is operably connected to each stator vane of the plurality of stator vanes such that movement of the synchronization ring urges rotation of each stator vane of the plurality of stator vanes about their respective stator vane axes. A plurality of impingement openings extend through the engine case from the interior of the engine case to the exterior of the engine case. The plurality of impingement openings are configured to direct flowpath gases from the interior of the engine case to impinge on the synchronization ring, thereby reducing a thermal mismatch between the engine case and the synchronization ring.

Additionally or alternatively, in this or other embodiments the plurality of impingement openings each have an impingement opening outlet positioned at a same axial location as the synchronization ring.

Additionally or alternatively, in this or other embodiments the plurality of impingement openings each extend perpendicular to an engine central longitudinal axis.

Additionally or alternatively, in this or other embodiments the plurality of impingement openings each extend non-perpendicular to an engine central longitudinal axis.

Additionally or alternatively, in this or other embodiments the plurality of impingement openings each extend at an opening angle of between 45 degrees and 90 degrees relative to the engine central longitudinal axis.

Additionally or alternatively, in this or other embodiments the plurality of stator vanes are each operably connected to the synchronization ring via a vane arm.

Additionally or alternatively, in this or other embodiments the plurality of impingement openings are equally spaced about a circumference of the engine case.

Additionally or alternatively, in this or other embodiments the engine case is a compressor case or a turbine case of a gas turbine engine.

In yet another embodiment, a method of operating a stator vane angle system includes rotating a plurality of stator vanes about their respective vane axes via rotation of a synchronization ring operably connected to the plurality of stator vanes. The stator vanes are positioned at an interior of an engine case and the synchronization ring is positioned at an exterior of the engine case. Flowpath gases are urged through a plurality of impingement openings extending from the interior of the engine case to the exterior of the engine case. The flowpath gases are directed through an opening exit of each impingement opening of the plurality of impingement openings to impinge on the synchronization ring, and a thermal mismatch is reduced between the engine casing and the synchronization ring via the impingement of the flowpath gases on the synchronization ring.

Additionally or alternatively, in this or other embodiments the flowpath gases are urged perpendicular to an engine central longitudinal axis via the plurality of impingement openings each extending perpendicular to an engine central longitudinal axis.

Additionally or alternatively, in this or other embodiments the flowpath gases are urged non-perpendicular to an engine central longitudinal axis via the plurality of impingement openings each extend non-perpendicular to an engine central longitudinal axis.

Additionally or alternatively, in this or other embodiments the engine case is a compressor case or a turbine case of a gas turbine engine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
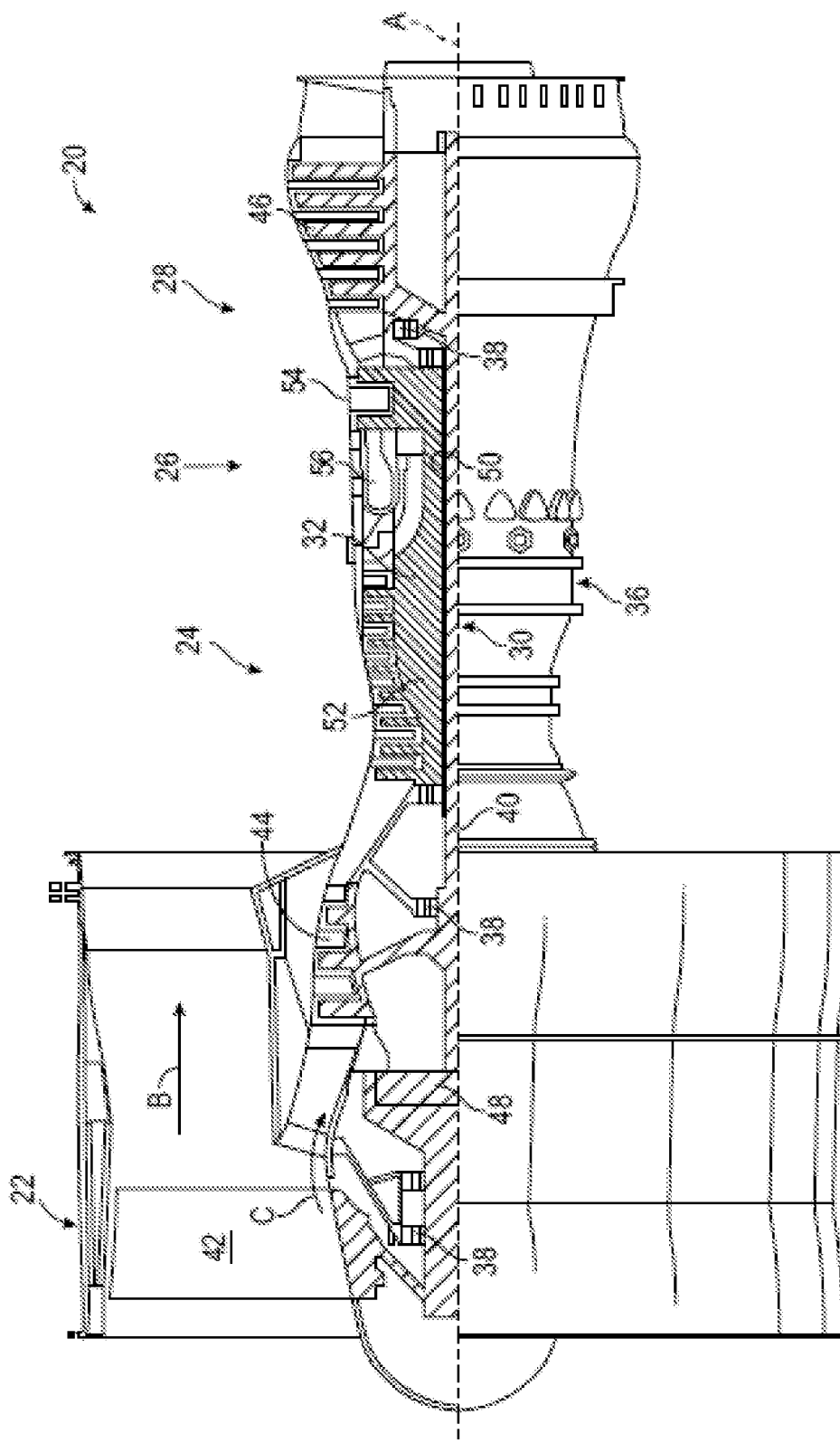
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
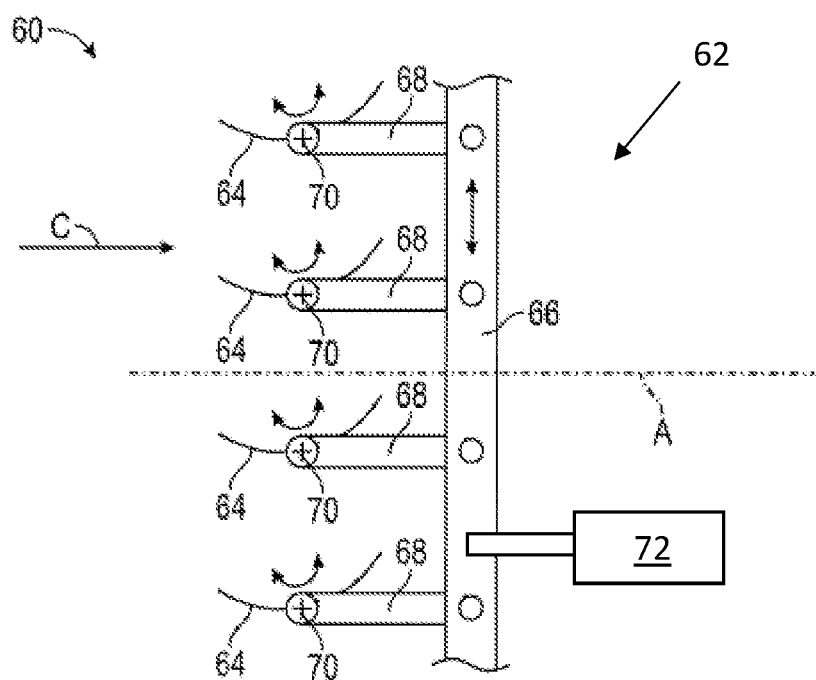
FIG. 2 is an illustration of an embodiment of a stator vane angle system.

FIG. 2 illustrates a low compressor stator row 60, having a variable stator vane angle (SVA) system 62 with a plurality of stator vanes 64. Each of the stator vanes 64 is connected to a synchronization ring 66 via a vane arm 68. The assembly is configured such that when the synchronization ring 66 is rotated circumferentially about the engine central longitudinal axis A, each of the stator vanes 64 rotates about a vane axis 70 by, for example, an actuator 72 operably connected to the synchronization ring 66. Rotation of the stator vanes 64 about their respective vane axes 70 changes a leading edge incidence angle and a trailing edge discharge angle of the flow by varying a pitch of the vanes 64 relative to the core flow C. While described herein in the context of a low pressure compressor 44 of a gas turbine engine 20, one skilled in the art will readily appreciate that the present disclosure may be similarly applied to synchronization ring and vane arrangements in other sections of the gas turbine engine 20, for example, the fan section 42, the low pressure turbine 46, the high pressure compressor 52 or the high pressure turbine 54.

Figure 3:
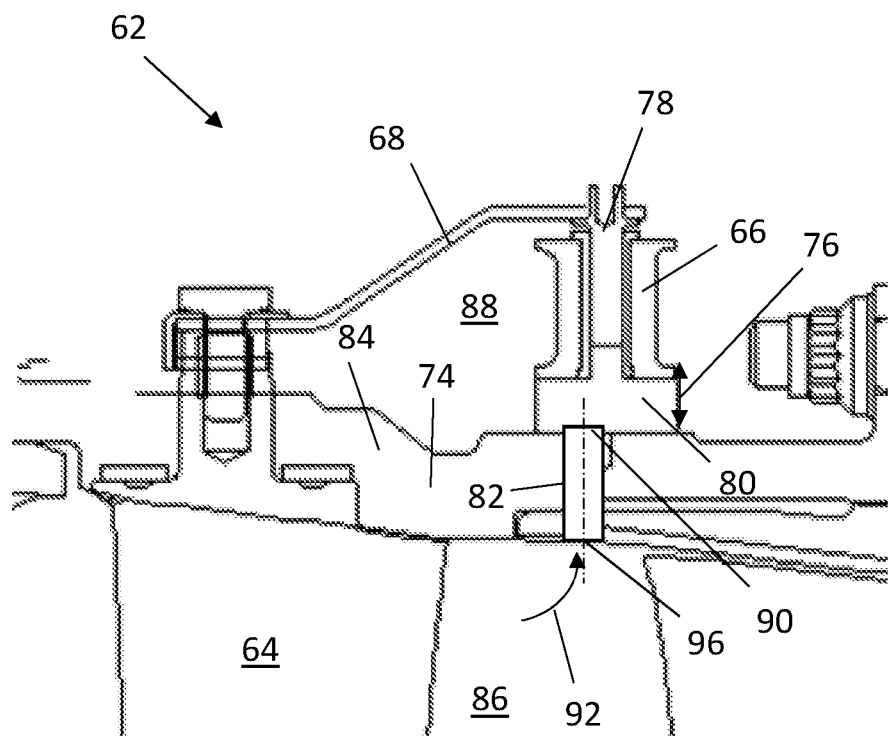
FIG. 3 is a partial cross-sectional view of an embodiment of a stator vane angle system.

Referring to FIG. 3, the synchronization ring 66 is secured to an exterior 88 of an engine case, for example, a compressor case 74 while the stator vanes 64 are disposed at an interior 86 of the compressor case 74. In a typical gas turbine engine 20, the compressor case 74 has a quicker thermal response than the synchronization ring 66, thus the synchronization ring 66 and the compressor case 74 are configured with a radial gap 76 between the two components to absorb the thermal mismatch. A sync ring pin 78 connects each vane arm 68 to the synchronization ring 66. In some embodiments, a compressible bumper 80 may be located in the radial gap 76. To reduce the thermal mismatch between the synchronization ring 66 and the compressor case 74 during operation of the gas turbine engine 20, a plurality of impingement openings 82 extend through a case wall 84 of the compressor case 74, from the interior 86 of the compressor case 74 to the exterior 88 of the compressor case 74. The plurality of impingement openings 82 are located at locations radially inboard of the synchronization ring 66, and in some embodiments an impingement opening outlet 90 is at a same axial location as the synchronization ring 66. The impingement openings 82 direct hot gas path airflow 92 from the interior 86 of the compressor case 74 to impinge on the synchronization ring 66. Such impingement increases the thermal response of the synchronization ring 66 relative to the compressor case 74. This reduces the thermal mismatch between the components. As such, the radial gap 76 may be reduced relative to configurations without the impingement openings 82. Reduction of the radial gap 76 improves accuracy of stator vane 64 rotation and positioning.

In some embodiments, the impingement openings 82 are equally spaced about the circumference of the compressor case 74, while in other embodiments the spacing may be varied to address circumferential variation in thermal mismatch between the compressor case 74 and the synchronization ring 66.

Figure 4:
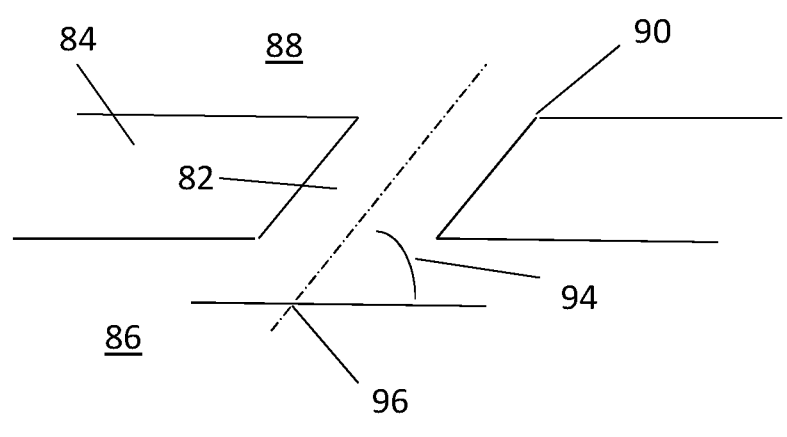
FIG. 4 is a cross-sectional view of an impingement opening of an embodiment of a stator vane angle system.

Further, while in the embodiment of FIG. 3, the impingement openings 82 extend in a radial direction perpendicular to the engine central longitudinal axis A, in other embodiments, such as shown in FIG. 4 the impingement openings 82 may extend non-perpendicular to the engine central longitudinal axis A. For example, the impingement openings 82 may extend at an opening angle 94 of between 45 degrees and 90 degrees relative to the engine central longitudinal axis A. While the embodiments of FIGS. 3 and 4 illustrates impingement openings 82 extending along a linear opening axis 96, one skilled in the art will readily appreciate that in other embodiments the impingement openings 82 may extend along other paths, for example, a curvilinear axis or the like.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A stator vane angle system, comprising:
   an engine case;
   a plurality of stator vanes disposed at an interior of the engine case, each stator vane rotatable about a stator vane axis;
   a synchronization ring disposed at an exterior of the engine case, the synchronization ring operably connected to each stator vane of the plurality of stator vanes such that movement of the synchronization ring urges rotation of each stator vane of the plurality of stator vanes about their respective stator vane axes; and
   a plurality of impingement openings extending through the engine case from the interior of the engine case to the exterior of the engine case, the plurality of impingement openings configured to direct flowpath gases from the interior of the engine case to impinge on the synchronization ring to reduce a thermal mismatch between the engine case and the synchronization ring.

2. The stator vane angle system of claim 1, wherein the plurality of impingement openings each have an impingement opening outlet disposed at a same axial location as the synchronization ring.

3. The stator vane angle system of claim 1, wherein the plurality of impingement openings each extend perpendicular to an engine central longitudinal axis.

4. The stator vane angle system of claim 1, wherein the plurality of impingement openings each extend non-perpendicular to an engine central longitudinal axis.

5. The stator vane angle system of claim 4, wherein the plurality of impingement openings each extend at an opening angle of between 45 degrees and 90 degrees relative to the engine central longitudinal axis.

6. The stator vane angle system of claim 1, wherein the plurality of stator vanes are each operably connected to the synchronization ring via a vane arm.

7. The stator vane angle system of claim 1, wherein the plurality of impingement openings are equally spaced about a circumference of the engine case.

8. The stator vane angle system of claim 1, wherein the engine case is a compressor case or a turbine case of a gas turbine engine.

9. A gas turbine engine, comprising:
a combustor; and
a stator vane angle system operably connected to the combustor, the stator vane angle system including:
an engine case;
a plurality of stator vanes disposed at an interior of the engine case, each stator vane rotatable about a stator vane axis;
a synchronization ring disposed at an exterior of the engine case, the synchronization ring operably connected to each stator vane of the plurality of stator vanes such that movement of the synchronization ring urges rotation of each stator vane of the plurality of stator vanes about their respective stator vane axes; and
a plurality of impingement openings extending through the engine case from the interior of the engine case to the exterior of the engine case, the plurality of impingement openings configured to direct flowpath gases from the interior of the engine case to impinge on the synchronization ring to reduce a thermal mismatch between the engine case and the synchronization ring.

10. The gas turbine engine of claim 9, wherein the plurality of impingement openings each have an impingement opening outlet disposed at a same axial location as the synchronization ring.

11. The gas turbine engine of claim 9, wherein the plurality of impingement openings each extend perpendicular to an engine central longitudinal axis.

12. The gas turbine engine of claim 9, wherein the plurality of impingement openings each extend non-perpendicular to an engine central longitudinal axis.

13. The gas turbine engine of claim 12, wherein the plurality of impingement openings each extend at an opening angle of between 45 degrees and 90 degrees relative to the engine central longitudinal axis.

14. The gas turbine engine of claim 9, wherein the plurality of stator vanes are each operably connected to the synchronization ring via a vane arm.

15. The gas turbine engine of claim 9, wherein the plurality of impingement openings are equally spaced about a circumference of the engine case.

16. The gas turbine engine of claim 9, wherein the engine case is a compressor case or a turbine case of a gas turbine engine.

17. A method of operating a stator vane angle system, comprising:
rotating a plurality of stator vanes about their respective vane axes via rotation of a synchronization ring operably connected to the plurality of stator vanes, the stator vanes disposed at an interior of an engine case and the synchronization ring disposed at an exterior of the engine case;
urging flowpath gases through a plurality of impingement openings extending from the interior of the engine case to the exterior of the engine case;
directing the flowpath gases through an opening exit of each impingement opening of the plurality of impingement openings to impinge on the synchronization ring; and
reducing a thermal mismatch between the engine casing and the synchronization ring via the impingement of the flowpath gases on the synchronization ring.

18. The method of claim 17, further comprising urging the flowpath gases perpendicular to an engine central longitudinal axis via the plurality of impingement openings each extending perpendicular to the engine central longitudinal axis.

19. The method of claim 17, further comprising urging the flowpath gases non-perpendicular to an engine central longitudinal axis via the plurality of impingement openings each extending non-perpendicular to the engine central longitudinal axis.

20. The method of claim 17, wherein the engine case is a compressor case or a turbine case of a gas turbine engine.

* * * * *